(12) United States Patent
Zhu et al.

(10) Patent No.: US 11,835,671 B2
(45) Date of Patent: Dec. 5, 2023

(54) METHOD AND SYSTEM FOR ELIMINATING SEISMIC ACQUISITION FOOTPRINT THROUGH GEOLOGICAL GUIDANCE

(71) Applicant: SAUDI ARABIAN OIL COMPANY, Dhahran (SA)

(72) Inventors: Weihong Zhu, Dhahran (SA); Hussain I. Hammad, Tarut (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 314 days.

(21) Appl. No.: 17/388,662

(22) Filed: Jul. 29, 2021

(65) Prior Publication Data
US 2023/0046786 A1    Feb. 16, 2023

(51) Int. Cl.
G06K 9/00    (2022.01)
*G01V 1/34*    (2006.01)
*G06V 10/25*    (2022.01)

(52) U.S. Cl.
CPC .............. *G01V 1/345* (2013.01); *G06V 10/25* (2022.01); *G01V 2210/74* (2013.01); *G06F 2218/02* (2023.01); *G06F 2218/14* (2023.01)

(58) Field of Classification Search
CPC .......... G01V 1/50; G01V 1/303; G01V 1/362; G01V 2210/52; G06T 7/337;
(Continued)

(56) References Cited

U.S. PATENT DOCUMENTS 6,691,075 B1    2/2004   Winbow et al.
6,801,473 B2   10/2004   Matteucci et al.
(Continued)

FOREIGN PATENT DOCUMENTS

| CN | 112255684 A | 1/2021 |
|----|-------------|--------|
| WO | 2015/160652 A1 | 10/2015 |
| WO | 2016/075550 A1 | 5/2016 |

OTHER PUBLICATIONS

Yedlin, M., I. Jones, and B. Narod. "Application of the Karhunen-Loève transform to diffraction separation." IEEE transactions on acoustics, speech, and signal processing 35.1 (1987): 2-8. (Year: 1987).*

(Continued)

*Primary Examiner* — Avinash Yentrapati
(74) *Attorney, Agent, or Firm* — Osha Bergman Watanabe & Burton LLP (57) ABSTRACT

Systems and method are claimed for forming an artifact attenuated seismic image. The method includes obtaining an input seismic image, selecting a seismic partition from the input seismic image and determining a seismic dip for the seismic partition. The method further includes determining flattened seismic partition from the seismic partition based, at least in part, on the seismic dip, determining a filtered seismic partition from the flattened seismic partition, and determining an unflattened seismic segment based on the filtered seismic partition. The method still further includes determining the artifact attenuated seismic image based on the unflattened seismic segment. The system includes a seismic source, a plurality of seismic receivers for detecting and recording an observed seismic dataset generated by the radiated seismic wave; and a seismic processor configured form the artifact attenuated seismic image.

20 Claims, 10 Drawing Sheets

(58) Field of Classification Search
CPC ....... G06T 3/0068; G06T 3/0093; G06T 7/20; G06T 2207/20024
See application file for complete search history.

(56) References Cited

U.S. PATENT DOCUMENTS

| | | | |
|---|---|---|---|
| 8,463,551 | B2 | 6/2013 | Aarre |
| 8,504,300 | B2 | 8/2013 | Dorn et al. |
| 9,429,668 | B2 | 8/2016 | Huo et al. |
| 9,645,268 | B2 | 5/2017 | Priezzhev et al. |
| 10,725,190 | B2 | 7/2020 | Gratacos et al. |
| 10,761,230 | B2 | 9/2020 | Goggin et al. |
| 2015/0276956 | A1 | 10/2015 | Khalil et al. |
| 2016/0061976 | A1* | 3/2016 | Hu .................. G01V 1/30 367/7 |
| 2016/0259075 | A1 | 9/2016 | Tyagi et al. |
| 2016/0327672 | A1 | 11/2016 | Lacombe et al. |
| 2017/0248716 | A1* | 8/2017 | Poole ............... G01V 1/32 |
| 2018/0059275 | A1* | 3/2018 | Bandura ........... G01V 1/36 |
| 2019/0011582 | A1 | 1/2019 | Aarre |
| 2019/0383965 | A1 | 12/2019 | Salman et al. |

OTHER PUBLICATIONS

M. J. Yedlin et al., "Application of the Karhunen-Loeve Transform to Diffraction Separation", vol. 35, No. 1, Jan. 1, 1987, IEEE Inc. (7 pages).

International Search Report and Written Opinion issued in International Application No. PCT/US2022/038869, dated Nov. 10, 2022 (14 pages).

Chopra, Satinder et al., "Acquistion Footprint—Its Detection and Removal"; Canadian Society of Exploration Geophysicists: Recorder; vol. 25, Issue 8, pp. 16-20; Oct. 2000 (4 pages).

Mahgoub, Mohamed et al., "Some thoughts of Acquisition Footprints Removal on 3D Seismic Data"; Proceedings of the Abu Dhabi International Petroleum Conference and Exhibition; Paper No. SPE-161372-MS; pp. 1-15; Nov. 11-14, 2012 (15 pages).

Huo, Shoudong et al., "Iterative dip-steering median filter"; Journal of Applied Geophysics; vol. 144; pp. 151-156; Sep. 2017 (6 pages).

Gülünay, Necati, "Acquisition geometry footprints removal"; SEG Technical Program Expanded Abstracts 1999; pp. 637-640; Jan. 1999 (4 pages).

Gulunay, Necati et al., "3D Data Acquisition Artifacts Removal—Spot Editing in the Spatial-Temporal Frequency Domain"; Proceedings of the 56th EAEG Meeting and Technical Exhibition; H049; Jun. 6-10, 1994 (2 pages).

Hampson, Gary, "The relationship between wavefield sampling and coherent noise attenuation in the CMP method"; SEG Technical Program Expanded Abstracts 1995; pp. 939-941; Jan. 1995 (3 pages).

Al-Bannagi, Muhammad S. et al., "Acquisition footprint suppression via the truncated SVD technique: Case studies from Saudi Arabia"; The Leading Edge; vol. 24, Issue 8; pp. 832-834; Aug. 2005 (3 pages).

Alali, Abdulmohsen et al., "Attribute-assisted footprint suppression using a 2D continuous wavelet transform"; Interpretation; vol. 6, Issue 2; pp. T457-T470; Apr. 6, 2018 (14 pages).

Gómez, Julian L. et al., "Footprint removal from seismic data with residual dictionary learning"; Geophysics; vol. 85, Issue 4; pp. V355-V365; May 8, 2020 (11 pages).

Hu, Jianxing et al., "Poststack migration deconvolution"; Geophysics; vol. 66, Issue 3; pp. 939-952; May 2001 (14 pages).

Yu, Jianhua et al., "Prestack migration deconvolution"; Geophysics; vol. 71, Issue 2; pp. S53-S62; Mar. 2006 (10 pages).

* cited by examiner

METHOD AND SYSTEM FOR ELIMINATING SEISMIC ACQUISITION FOOTPRINT THROUGH GEOLOGICAL GUIDANCE

BACKGROUND

Seismic surveys are frequently conducted by participants in the oil and gas industry. Seismic surveys are conducted over subterranean regions of interest during the search for, and characterization of, hydrocarbon reservoirs. In seismic surveys, a seismic source generates seismic waves which propagate through the subterranean region of interest are and detected by seismic receivers. Typically, both seismic sources and seismic receivers are located on the earth's surface. The seismic receivers detect and store a time-series of samples of earth motion caused by the seismic waves. The collection of time-series of samples recorded at many receiver locations generated by a seismic source at many source locations constitutes a seismic data set.

To determine earth structure, including the presence of hydrocarbons, the seismic data set may be processed. Processing a seismic data set includes a sequence of steps designed to correct for near-surface effects, attenuate noise, compensate of irregularities in the seismic survey geometry ("acquisition footprints"), calculate a seismic velocity model, image reflectors in the subterranean, calculate a plurality of seismic attributes to characterize the subterranean region of interest, and aid in decisions governing if, and where, to drill for hydrocarbons.

Noise and acquisition footprints, if unattenuated, may obscure subterranean structure or be misinterpreted as geological structure. Some approaches to attenuating noise and acquisition footprints rely on deploying seismic sources on a denser spatial grid, or on deploying seismic receivers on a denser spatial grid, or both. Such approaches add to already substantial logistical, environmental, and economic challenges of seismic data acquisition.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for forming an artifact attenuated seismic image. The method includes obtaining an input seismic image, selecting a seismic partition from the input seismic image and determining a seismic dip for the seismic partition. The method further includes determining flattened seismic partition from the seismic partition based, at least in part, on the seismic dip, determining a filtered seismic partition from the flattened seismic partition, and determining an unflattened seismic segment based on the filtered seismic partition. The method still further includes determining the artifact attenuated seismic image based on the unflattened seismic segment.

In general, in one aspect, embodiments relate to a non-transitory computer readable medium storing instructions executable by a computer processor, the instructions including functionality for receiving an input seismic image, selecting a seismic partition from the input seismic image, determining a seismic dip for the seismic partition, and determining a flattened seismic partition from the seismic partition based, at least in part, on the seismic dip. The instructions further include functionality for determining a filtered seismic partition from the flattened seismic partition, determining an unflattened seismic segment based, at least in part, on the filtered seismic partition, and determining the artifact attenuated seismic image based, at least in part, on the unflattened seismic segment.

In general, in one aspect, embodiments relate to a system for forming an artifact attenuated seismic image. The system includes a seismic source to emit a radiated seismic wave, a plurality of seismic receivers for detecting and recording an observed seismic dataset generated by the radiated seismic wave, and a seismic processor. The seismic processor is configured to receive an input seismic image, determine a seismic partition from the input seismic image, determine a seismic dip for the seismic partition, and determine a flattened seismic partition from the seismic partition based, at least in part, on the seismic dip. The seismic processor is further configured to determine a filtered seismic partition from the flattened seismic partition, determine an unflattened seismic segment based, at least in part, on the filtered seismic partition, and determine the artifact attenuated seismic image based, at least in part, on the unflattened seismic segment.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

An input seismic image may display artifacts caused by a deficiency in the spatial sampling of a seismic survey geometry. Systems and methods are described herein for attenuating these artifacts by flattening seismic reflectors, applying a filter that passes flat features while attenuating non-flat features, then reversing the flattening.

Figure 1:
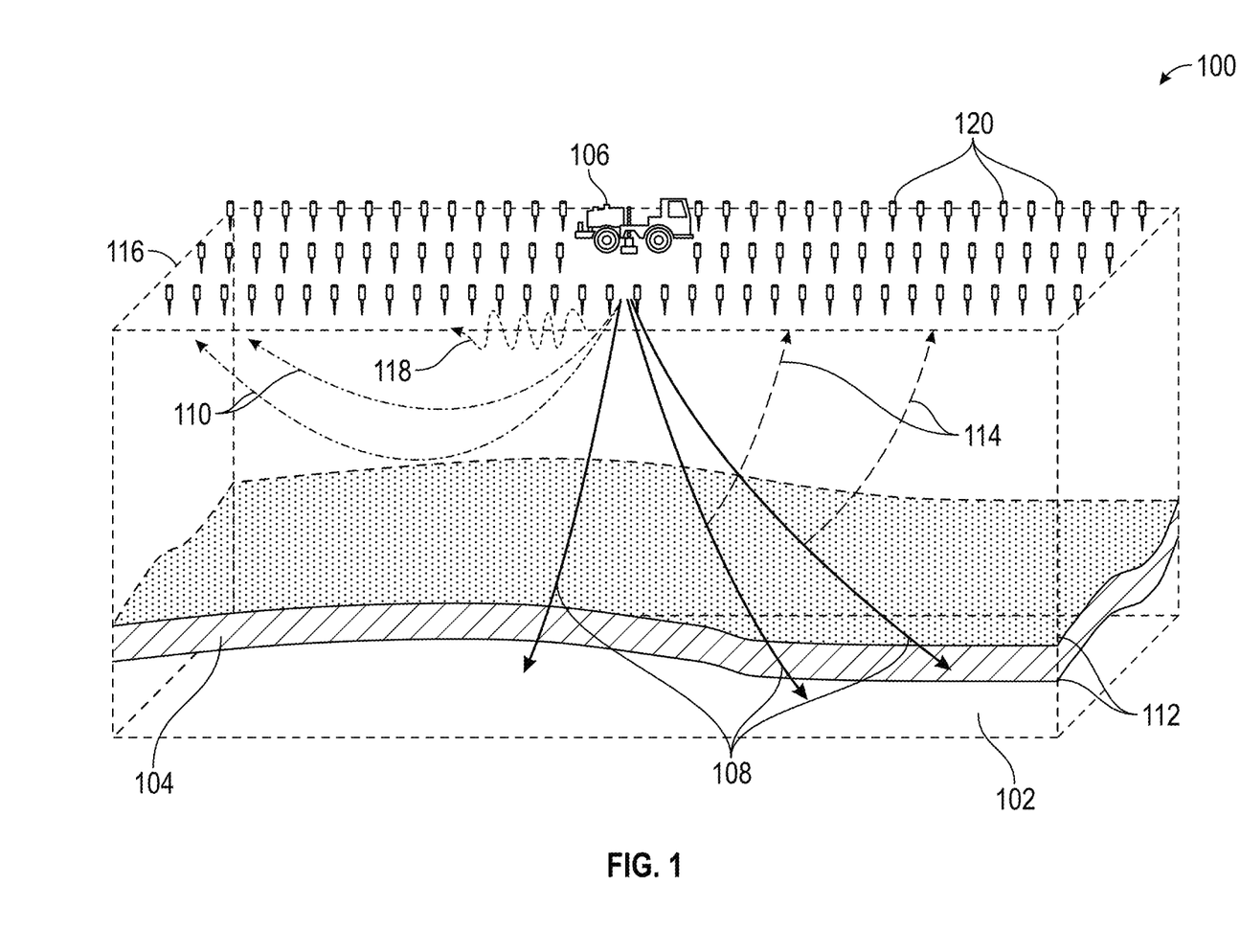
FIG. 1 depicts a seismic survey in accordance with one or more embodiments.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108). The type of seismic source (106) may depend on the environment in which it is used, for example on land the seismic source (106) may be a vibroseis truck or an explosive charge, but in water the seismic source (106) may be an airgun. The radiated seismic waves (108) may return to the Earth's surface (116) as refracted seismic waves (110) or may be reflected by geological discontinuities (112) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the Earth's surface (116) and hence are not influenced, nor contain information about, portions of the subterranean region of interest (102) where hydrocarbon reservoirs (104) are typically located. Seismic receivers (120) located on or near the Earth's surface (116) detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discreet sample times. Usually the origin of the time-series, denoted t=0, is determined by the activation time of the seismic source (106). This time-series may be denoted a seismic "trace". The origin of a seismic trace may be taken as the earliest time sample and zero amplitude point. The seismic receivers (120) are positioned at a plurality of seismic receiver locations which we may denote $(x_r, y_r)$ where x and y represent orthogonal axes on the Earth's surface (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (116) and t denotes the time sample at which the amplitude of ground-motion was measured.

However, a seismic survey (100) may include recordings of seismic waves generated by a seismic source (106) sequentially activated at a plurality of seismic source locations denoted $(x_s, y_s)$. In some cases, this may be achieved using a single seismic source (106) that is moved to a new location between activations. In other cases, a plurality of seismic sources (106) positioned at different locations may be used. Irrespective of how they are acquired, all the seismic traces acquired by a seismic survey (100) may be represented as a five-dimensional volume, with coordinate axes $(x_s, y_s, x_r, y_r, t)$, and called a "seismic dataset".

Figure 2A:
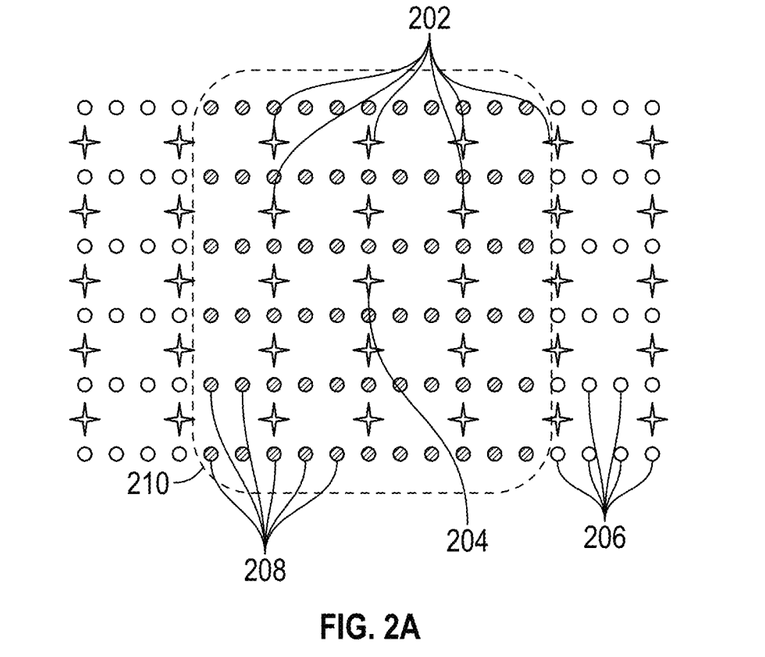
FIGS. 2A and 2B show seismic systems in accordance with one or more embodiments.

FIG. 2A depicts the geometry of a seismic survey in accordance with one or more embodiments. The seismic survey may include a plurality of source locations (202, 204), depicted in FIG. 2A by crosses, and a plurality of seismic receiver locations (206, 208), depicted in FIG. 2A by circles. The seismic source locations (202, 204) and the seismic receiver locations (206, 208) may be arranged on a regular grid, in accordance with some embodiments, and may be arranged on an irregular grid in accordance with other embodiments.

The seismic waves radiated by the activation of a seismic source at a single location (204), represented in FIG. 2A as a filled cross, may be recorded at all the seismic receiver locations (206, 208) in accordance with one or more embodiments or may be recorded at a portion of the seismic receiver location (208) in accordance with other embodiments. In particular, the seismic waves radiated by the activation of a seismic source at a single location (204) may be recorded at the seismic receiver locations (208), indicated in FIG. 2A by filled circles, in a neighborhood ("patch") (210) surrounding location of the activated seismic source (204). The patch (210) of locations at which the seismic waves radiated by the activation of a seismic source are recorded may move spatially as the location of the activated seismic source moves.

An input seismic image may be formed by combining the seismic traces recorded at a plurality of seismic receiver locations (206, 208) and generated by the activation of a seismic source at a plurality of seismic source locations (202, 204), in accordance with one or more embodiments. In accordance with one or more embodiments, the five-dimensional volume seismic dataset, D, with coordinate axes $(x_s, y_s, x_r, y_r, t)$, may be resorted into a five-dimensional volume seismic dataset, D, with coordinate axes $(x_m, y_m, x_h, y_h, t)$, where $x_m=(x_r+x_s)/2$ and $y_m=(y_r+y_s)/2$ are the surface spatial location equidistant from the seismic source location (204) and the seismic receiver location (208) and where $x_h=(x_r-x_s)/2$ and $y_h=(y_r-y_s)/2$ are the surface spatial separation of the seismic source location (204) from the seismic receiver location (208). A collection of seismic traces that share the same $x_m$ and $y_m$ may be called a "mid-point gather".

Figure 2B:
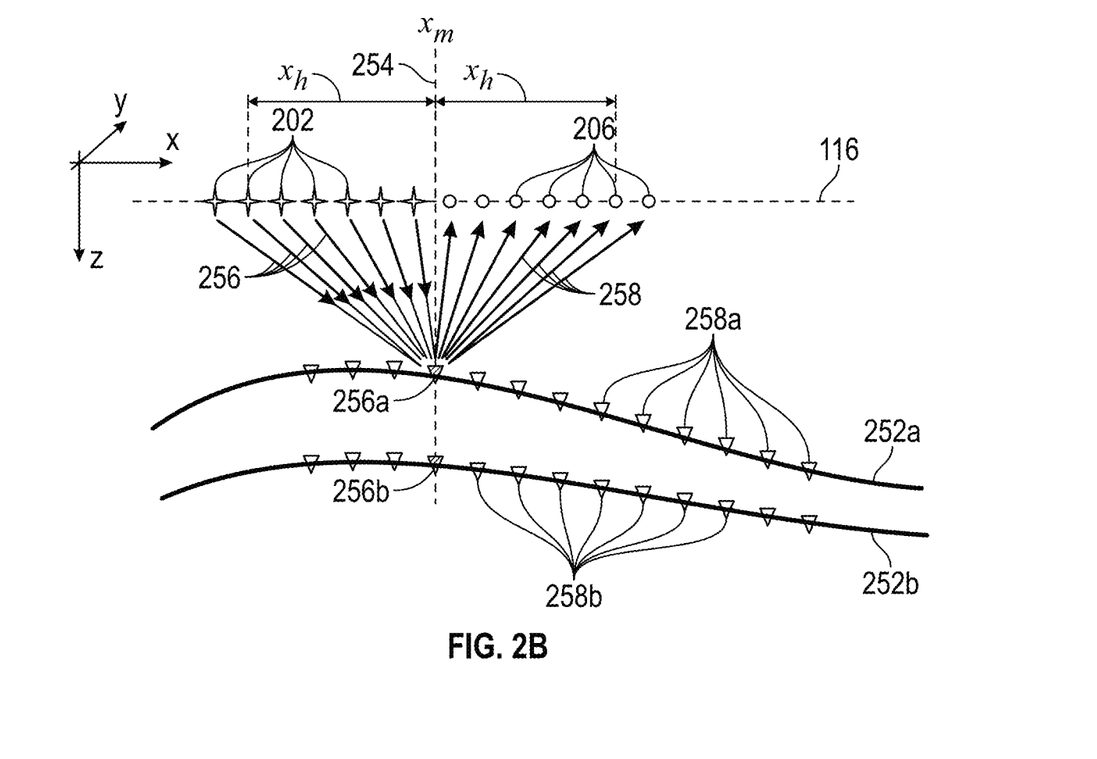

FIG. 2B depicts the geometry of a mid-point gather in accordance with one or more embodiments. A mid-point gather may include plurality of seismic source locations (202) and a plurality of seismic receiver locations (206) arranged symmetrically on the earth's surface (116) around a common mid-point (254). FIG. 2B further shows a seismic reflector (252) that may be a boundary between geological layers or may be the upper or lower boundary of a hydrocarbon reservoir, in accordance with one or more embodiments. FIG. 2B also depicts, schematically, the seismic waves (256) radiating from the seismic sources (202) and being reflected from the seismic reflector (252a, 252b) at a subsurface point (256a) beneath the mid-point (254) and the reflected seismic waves (258) propagating back to the seismic receivers (206). Seismic waves emitted at the seismic source location (202) and detected at a seismic receiver location (206) may be reflected from a plurality of seismic reflectors (252a, 252b) at a plurality of subsurface points (256a, 256b) each at a different depth below the common mid-point (254).

Although FIG. 2B only depicts seismic sources (202) and seismic receivers (206) that lie along a line denoted the x-axis, other seismic sources (202) and seismic receivers (206) displaced along the y-axis may also be included in the mid-point gather. Although all these seismic source locations and seismic receiver locations included in the mid-point gather share the same mid-point ($x_m$, $y_m$) they have different offsets ($x_h$, $y_h$).

The seismic waves traveling between a seismic source and a seismic receivers with large offsets typically travel a greater distance within the subsurface than seismic waves traveling between a seismic source and a seismic receiver with a small offset and consequently arrive later at the receiver. Thus, a seismic trace recorded at a greater offset than at a smaller offset may require correction to ensure that reflections from the same subsurface point (256a) appear on seismic traces from all offsets at the same time.

Seismic traces from all offsets within a mid-point gather may be combined to form a single mid-point trace. This combination may include summing over offsets ("stacking") to determine a single summed ("stacked") mid-point trace. A plurality of mid-point traces including reflections from a plurality of reflection points (258a, 258b) may be used to map subsurface reflectors (252a, 252b) within the subsurface.

Figure 3A:
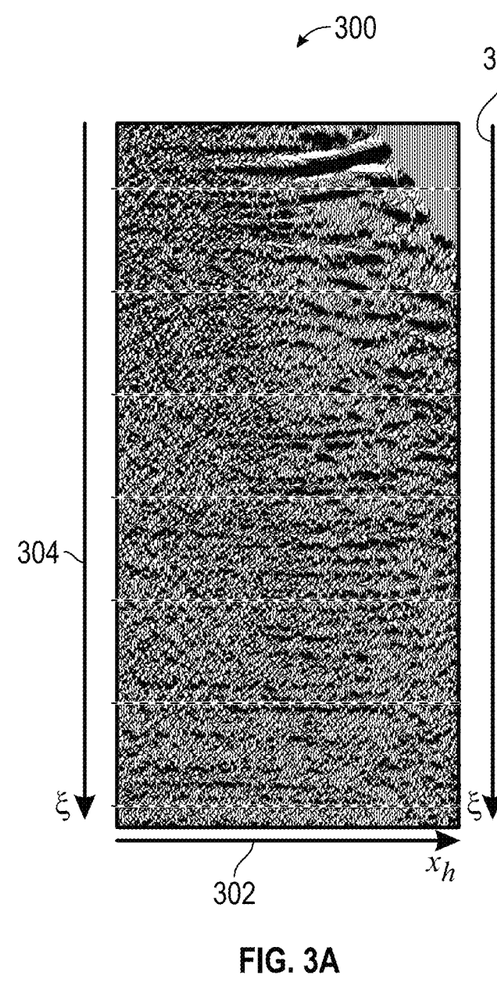
FIGS. 3A and 3B show seismic datasets in accordance with one or more embodiments.

FIG. 3A shows a mid-point gather (300) after correction for offset-dependent travel times, in accordance with one or more embodiments. The horizontal axis (302) represents offset, $x_h$. The vertical axis (304), $\xi$, may represent time, t, in accordance with some embodiments and may represent depth, z, in accordance with other embodiments. In FIG. 3A the seismic traces are shown plotted vertically with detected seismic wave amplitude plotted as a horizontal deflection.

Figure 3B:
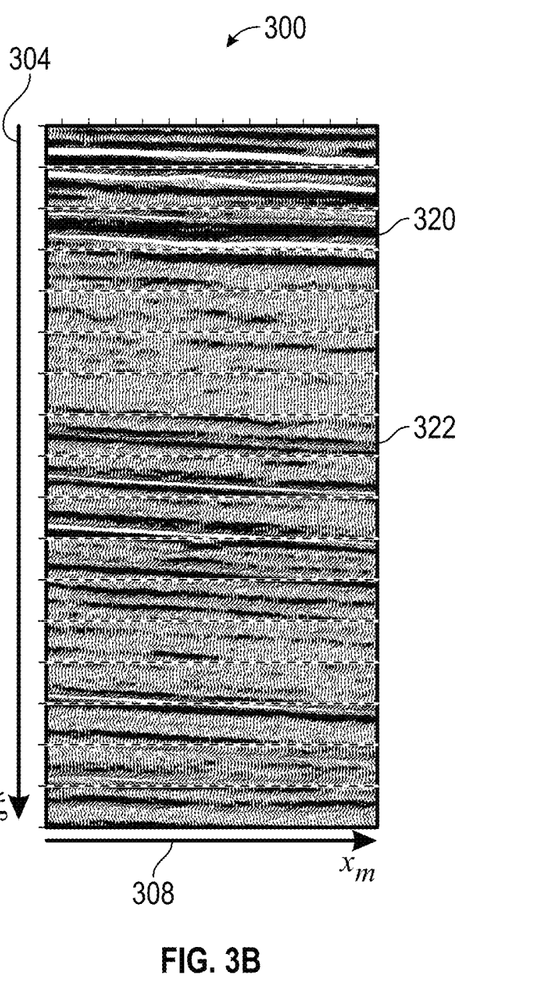

FIG. 3B shows a two-dimensional (2D) cross-section through an input seismic image (306) in accordance with one or more embodiments. The horizontal axis (308) represents mid-point distance $x_m$ and the vertical axis (304), $\xi$, represents time, t, in some embodiments and depth, z, in other embodiments. Each trace in the 2D cross-section through the input seismic image (306) shown in FIG. 3B represents a combined trace formed from a mid-point gather (300), such as the one shown in FIG. 3A. Large amplitude reflected seismic waves detected on a seismic trace are represented by large deflections of the trace in the horizontal direction, such as large deflection (320) and large deflection (322).

Figure 4A:
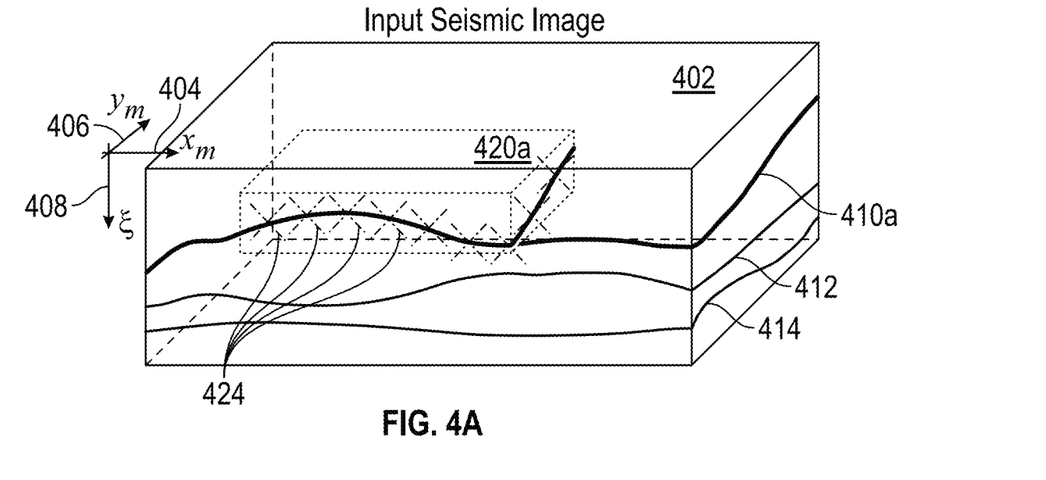
FIGS. 4A-4F show systems in accordance with one or more embodiments.

An input seismic image may be composed of a plurality of seismic traces. A 2D input seismic image may be composed of a plurality of seismic traces whose origins lie on a horizontal line or lie on a line on the earth's surface. A 3D input seismic image may be composed of a plurality of seismic traces whose origins lie on a horizontal plane or on the earth's surface. FIG. 4A schematically depicts a three-dimensional (3D) input seismic image (402) in accordance with one or more embodiments. The 3D input seismic image may extend in two orthogonal horizontal spatial dimensions $x_m$ (404) and $y_m$ (406) and in a third dimension $\xi$ (408). In some embodiments the horizontal spatial dimensions may be North and West but in other embodiments the horizontal spatial dimensions may be rotated at a non-zero angle to North and West. In some embodiments the third dimension (408) may be time and in other embodiments the third dimension (408) may be depth. The input seismic image (402) may show a plurality of seismic reflectors that extend in a predominantly horizontal plane. The plurality of seismic reflectors may include a shallow seismic reflector (410a), a moderate depth seismic reflector (412), and a deep seismic reflector (414). In some embodiments many more than three seismic reflectors may be present in the input seismic image (402). For clarity, the seismic reflectors (410a, 412, 414) in FIG. 4A are illustrated only where they intersect with the boundaries of the input seismic image (402) but typically they extend throughout most or all of the input seismic image (402).

The input seismic image (402) shown in FIG. 4A may be divided into one or more seismic partitions (420a) in accordance with one or more embodiments. In some embodiments, the seismic partition (420a) may be smaller than the input seismic image (420) in one, two, or all three dimensions. In other embodiments, the seismic partition (420a) may encompass the whole of the input seismic image (420) and in these embodiments the seismic partition (420a) may be identical to the input seismic image (420). The seismic partition (420a) may be chosen to enclose one reflector or a plurality of reflectors that share the same, or a similar, topographic variation within the partition. Typically, seismic reflectors (410a, 412, 414) are not completely flat but rather are positioned at different values of $\xi$ at different horizontal positions ($x_m$, $y_m$). At any point, the variation of $\xi(x_m, y_m)$ as a function of horizontal position may be described by the geological dip, $\eta=(\partial\xi/\partial x_m, \partial\xi/\partial y_m)$. While geological dip typically varies slowly and only departs from the horizontal plane by ten or fifteen degrees at most, seismic noise and acquisition footprints (424) may vary rapidly and dip at high angles.

Figure 4B:
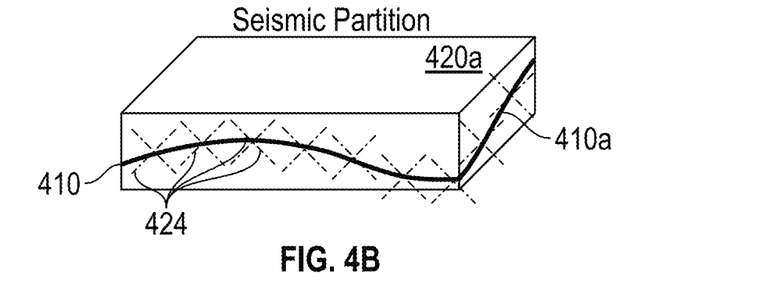

FIG. 4B shows the seismic partition (420a) extracted from the input seismic image (402) that contains a single dominant seismic reflector (410a) and a plurality of acquisition footprints (424) in accordance with one or more embodiments. The seismic reflector (410a) may exhibit a single geological dip throughout the seismic partition, in which case the seismic reflector forms a dipping plane. However, in other cases, such as the case illustrated in FIG. 4B, the seismic reflector may have a range of dips within the partition. The range of dips may be small and slowly spatially varying compared to the dip and variation of the acquisition footprints.

Figure 4C:
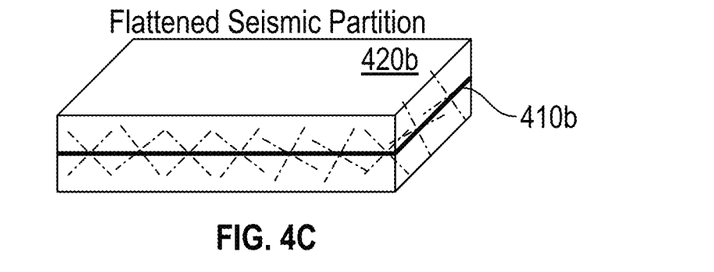

FIG. 4C shows the seismic partition (420b) after the seismic reflector (410a) has been flattened by a flattening operation to produce a flattened seismic reflector (410b), according to one or more embodiments. The flattened operation may include determining and applying a shift along the $\xi$-axis to each seismic trace in the seismic partition. The magnitude of the shift along the $\xi$-axis for each trace may be determined based upon the geological dip in accordance with one or more embodiments. Alternatively, the shift along the $\xi$-axis for each trace may be based on a lag of a peak in the amplitude of a cross-correlation function between a trace and its neighboring traces.

Figure 4D:
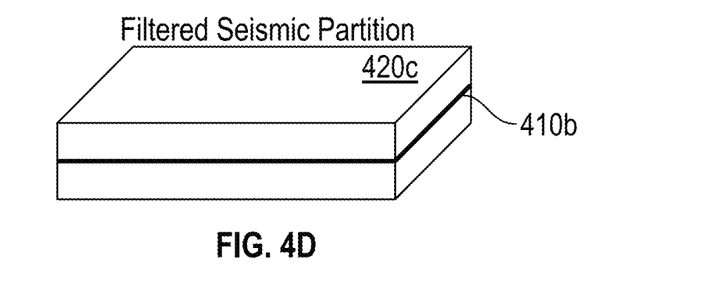

FIG. 4D depicts a filtered seismic partition (420c) in accordance with one or more embodiments. The filtered seismic partition (420c) may be produced from the flattened seismic partition (420b) by applying one or more filtering operations to remove or attenuate most or all non-flat elements of the flattened seismic partition (420b). The filtering operations may include a median filter operating in the horizontal plane or the filtering operations may include a frequency-wavenumber filter designed to preserve ("pass") flat elements of the flattened seismic partition (420b) and attenuate ("cut") non-flat elements. The filtering operations may include one or more of a plurality of filtering operations well known to one of ordinary skill in the art and designed to pass flat elements and cut non-flat elements of the flattened seismic partition.

Figure 4E:
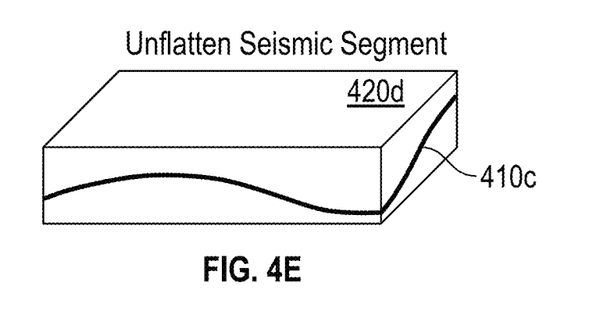

FIG. 4E depicts an unflattened seismic segment (420d) produced by applying to the filtered seismic partition (420c)

the inverse or the adjoint of the flattening operation previously applied to the seismic partition (420a). The portion of the seismic reflector (410c) within the unflattened seismic segment (420d) has the same dips and topography as the seismic reflector (410a) within the seismic partition (420). However, the noise and acquisition footprints (424) present in the seismic partition (420a) have been removed or attenuated in the unflattened seismic segment (420d).

Figure 4F:
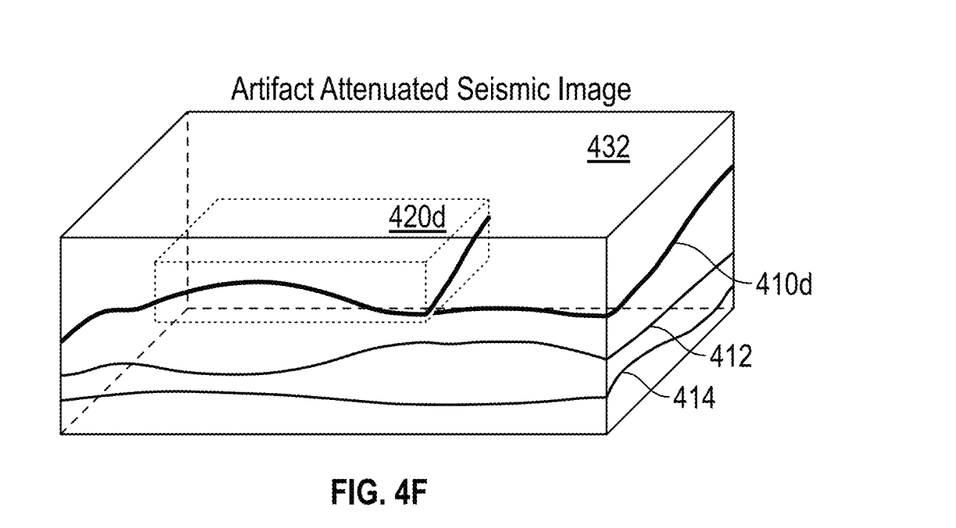

FIG. 4F depicts an artifact attenuated seismic image (432) that may be formed by combining a plurality of unflattened seismic segments, such as the unflattened seismic segment (420d) shown in FIG. 4E. The artifact attenuated seismic image (432) may contain a plurality of seismic reflectors (410d, 412, 414) but little or no seismic noise nor acquisition footprints.

Figure 5:
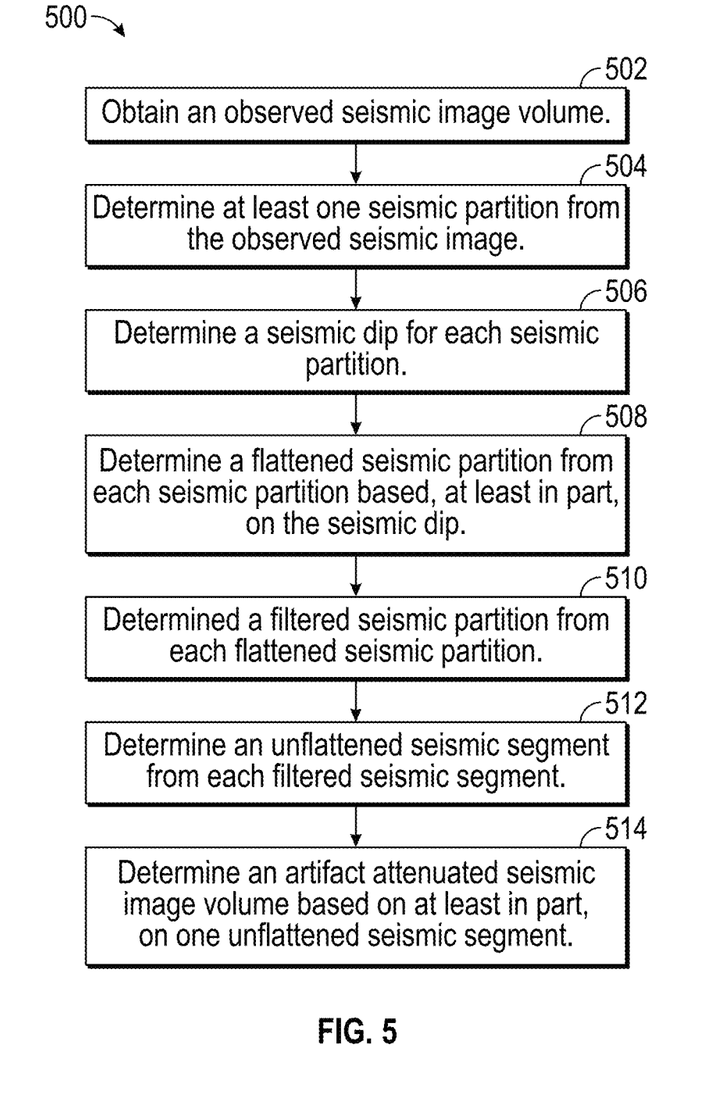
FIG. 5 shows a flowchart in accordance with one or more embodiments.

FIG. 5 illustrates a flowchart (500) in accordance with one or more embodiments. In Step 502 an input seismic image (402) is obtained. The input seismic image (402) may be a 2D seismic image or a 3D seismic image. In some embodiments the input seismic image (402) may be composed of a plurality of stacked mid-point gathers in the time-domain. In other embodiments, the input seismic image (402) may be composed of a plurality of migrated and stacked mid-point gathers in the depth-domain. In still further embodiments, the input seismic image (402) may be determined by migrating observed seismic traces using Kirchhoff migration, wave-equation migration, reverse time-migrations algorithms, or any other migration algorithm well known to one of ordinary skill in the art.

In Step 504 the input seismic image (402), $\Im(x)$, may be divided into one or more seismic partitions (420a), $\wp(x')$. The seismic partition (420a) $\wp(x')$ may be determined using a weighting operator $W(x, x')$:

$$\wp(x') = W(x, x')\Im(x),\qquad\text{Equation (1)}$$

where the weighting operator $W(x, x')$ contains the weights used for partitioning and $x=(x_m, y_m, \xi)$. In some embodiments, the weighting operator, W, may be a boxcar with weights of one within the seismic partition (420a) and weights of zero outside the seismic partition (420a). In other embodiments, the weighting operator, W, may be a smoothly varying function such as a 3D Gaussian weighting operator.

In one or more embodiments, the seismic partitions (420a) may be disjunct from one another, that is the seismic partitions (420a) may touch one another at their boundaries without either overlapping or leaving a gap between the adjacent boundaries of neighboring seismic partitions (420a). In other embodiments the seismic partitions (420a) may be overlapping seismic partitions.

In Step 506, in accordance with one or more embodiments, a geological dip may be determined for each seismic partition (420a). In other embodiments, a range of seismic dips may be determined for one or more of the seismic partitions (420a). In some embodiments, the seismic dip may be determined by manual interpretation of the seismic partition (420a) or of the input seismic image (402). In other embodiments the seismic dip may be determined using automated seismic dip determination techniques well known to one of ordinary skill in the art. In still further embodiments, the seismic dip may be determined by a combination of both manual and automated methods.

In accordance with one or more embodiments, the seismic partition (420a) may be decomposed into a plurality of overlapping windows in the $\xi$-$x_m$ domain. For each window, the seismic partition may be transformed into a Fourier-radial domain. The transform may be performed using a two-dimensional Fourier Transform into a Cartesian frequency-wavenumber domain followed by a wrapped radial trace transform. A map of peak amplitude values may be calculated by summing along each radial direction in the Fourier-radial domain and the map may be transformed back into the $\xi$-$x_m$ domain. A median filter may be iteratively applied along the dominant dips in a descending sequence and a map of the seismic dip may be determined by summing the output from each iteration.

In Step 508, in accordance with one or more embodiments, a dip-dependent flattening operator, $\mathcal{F}_\eta$, may be applied to the seismic partition (420a):

$$\mathbb{Q}(u) = \mathcal{F}_\eta \wp(x),\qquad\text{Equation (2)}$$

where $\mathbb{Q}(u)$ is the flattened seismic partition (420b) with the new transformation variables, $u=(x_m, y_m, \tau)$. The dip-dependent flattening operation may flatten the dominant seismic reflectors (410b) in the seismic partition (420b).

In Step 510, in accordance with one or more embodiments, one or more filters, $\mathcal{M}$, may be applied over the planes defined by $\tau$=const. to generate a filtered seismic partition (420c), $\mathbb{R}$, such that:

$$\mathbb{R}(u) = \mathcal{M}(\mathbb{Q}(u)).\qquad\text{Equation (3)}$$

In accordance with one or more embodiments, the filtering operator, $\mathcal{M}$, may be applied over a sliding window in the $\tau$=const. plane, such that the output of the filter depends on a plurality of neighboring values in the plane. In one or more embodiments the filtering operator, $\mathcal{M}$, may be a 2D median filter.

In Step 512, in accordance with one or more embodiments, and unflattened seismic segment may be determined. The unflattened seismic segment, denoted $\wp_f$, may be determined by applying the adjoint or the inverse of the flattening operator, denoted $\mathcal{F}_\eta^\dagger$, such that:

$$\wp_f(x) = \mathcal{F}_\eta^\dagger(\mathbb{R}(u)).\qquad\text{Equation (4)}$$

Finally, in Step 514, one or more unflattened seismic segment (420d) may be combined to determine an artifact attenuated seismic image (432), $\Im_f(x)$. The artifact attenuated seismic image (432) may be determined by applying the adjoint or the inverse of the weighting operator, denoted $W^\dagger$, such that:

$$\Im_f(x) = \Sigma_i W^\dagger(x, x'_i)\wp_f(x'_i)\qquad\text{Equation (5)}$$

where i enumerates members of a set of unflattened seismic image segments (420d).

Figure 6:
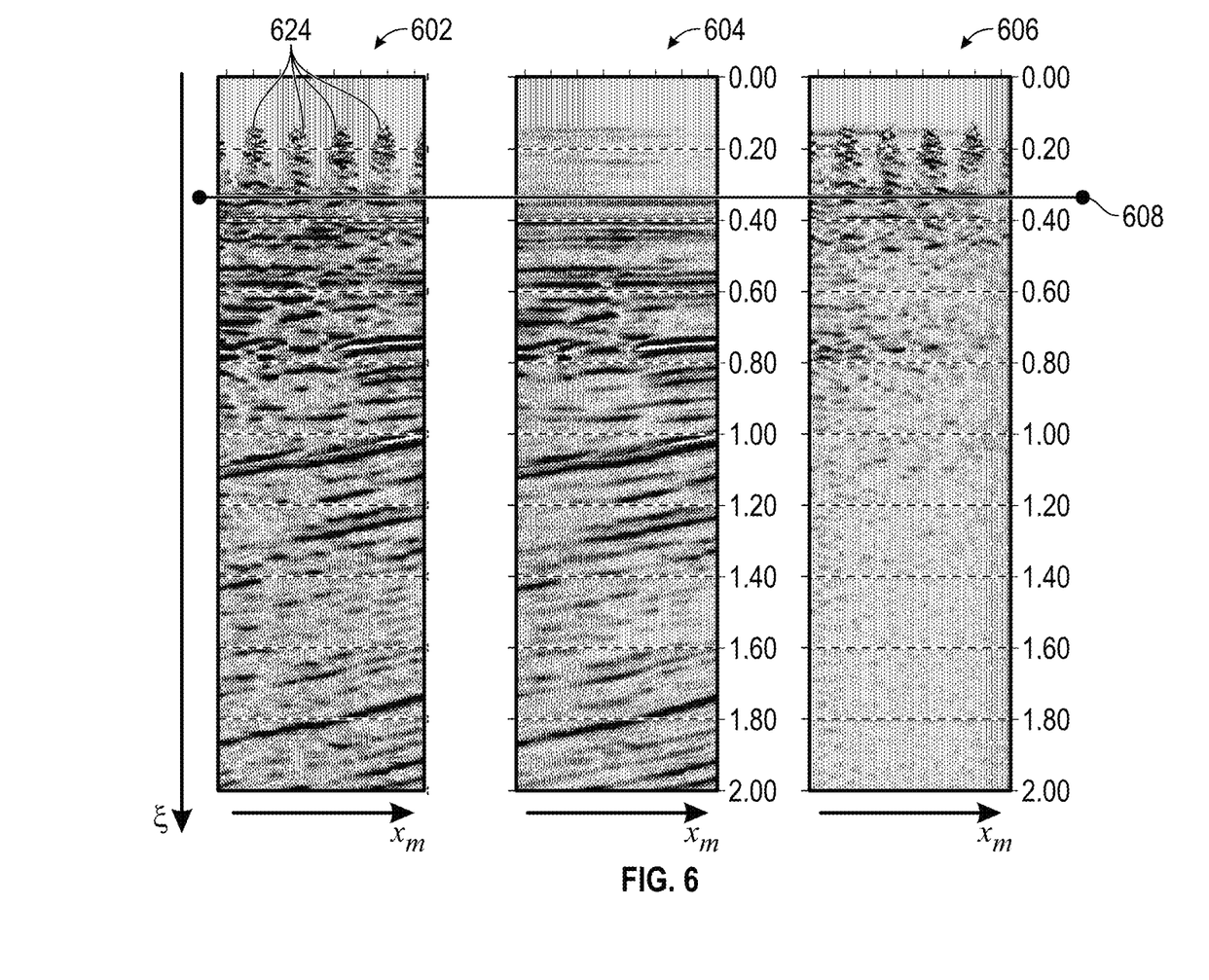
FIG. 6 shows seismic images in accordance with one or more embodiments.

The following paragraphs and accompanying figures illustrate the application of the workflow depicted in FIG. 5 to the input seismic image (602) shown in the $x_m$-$\xi$ plane in FIG. 6. Input seismic image (602) also shows portions dominated by acquisition footprints (624) in accordance with one or more embodiments. In the example (602) the acquisition footprints (624) at small values of are particularly visible. Although acquisition footprints are often pronounced at small values of $\xi$ acquisition footprints frequently occur at all values of $\xi$.

FIG. 6 further shows a cross-section of the artifact attenuated seismic image (604) in the $x_m$-$\xi$ plane. The artifact attenuated seismic image (604) may be compared with the input seismic image (602). FIG. 6 also shows the difference (606) between the input seismic image (602) and the artifact attenuated image (604). It will be readily apparent to one of ordinary skill in the art that the workflow depicted in FIG. 5 has effectively removed the seismic footprint artifacts (606) from the input seismic image (602) to produce a less artifact attenuated seismic image (604) with a much greater signal-to-noise ratio than that of the input seismic image (602). FIG. 6 also indicates the loci of a plane of constant $\xi$ (608).

Figure 7A:
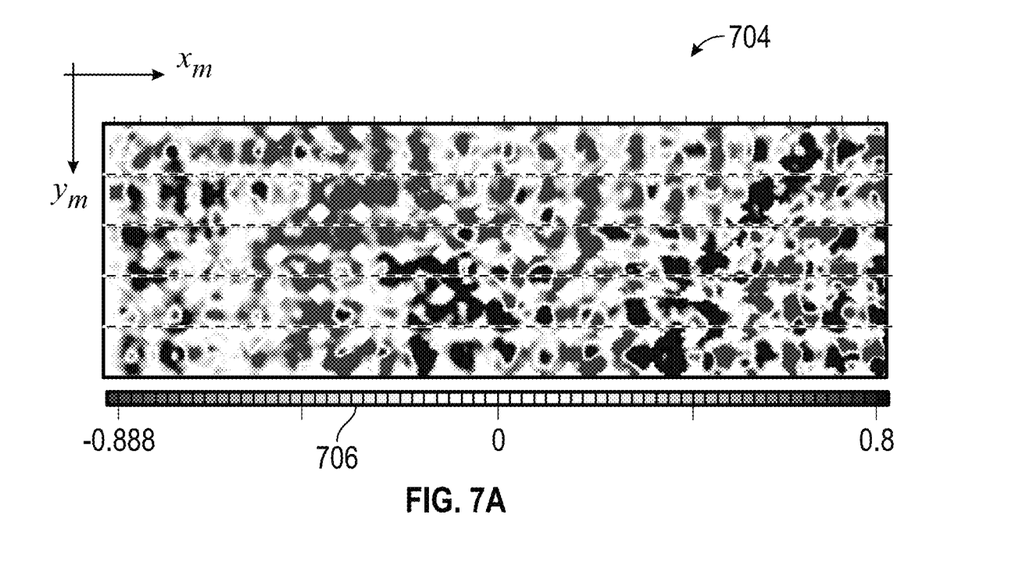
FIGS. 7A-7B show seismic images in accordance with one or more embodiments.

FIG. 7A shows a cross-section (704) through the input seismic image (402) at the plane of constant $\xi$ (608) indicated in FIG. 6B. The amplitude of the input seismic image (402) on this plane is shown on a grayscale (706). In addition to smooth changes in amplitude a clear superimposed "checkerboard" pattern is readily apparent to one of ordinary skill in the art. The checkerboard pattern is a manifestation of the acquisition footprint.

Figure 7B:
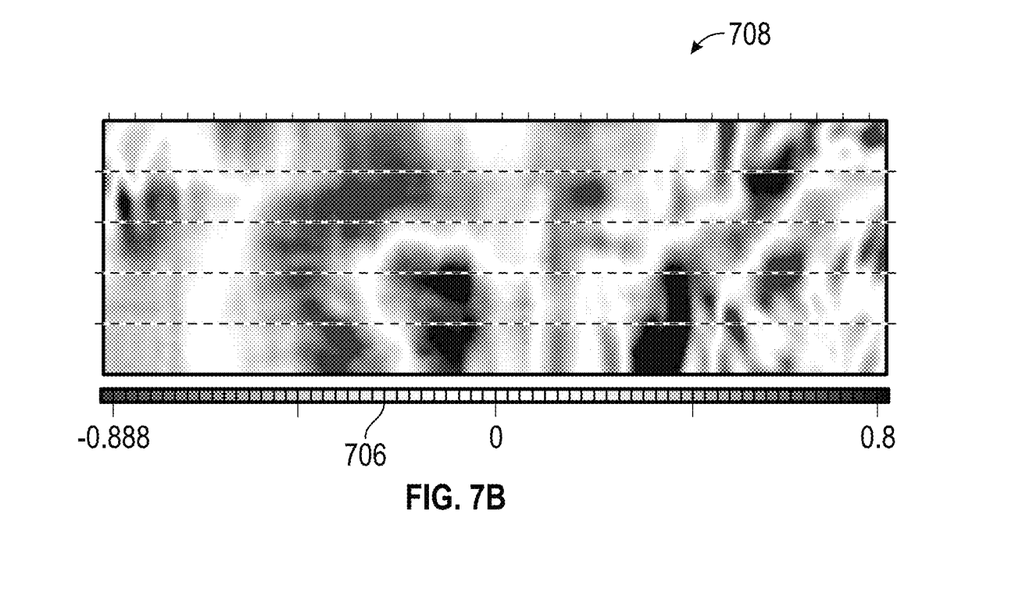

FIG. 7B shows a cross-section (708) through the artifact attenuated seismic image (432) in the plane of constant $\xi$ (608) indicated in FIG. 6B. The amplitude of the input seismic image on this plane is shown on a grayscale (706). It will be readily apparent to one of ordinary skill in the art that the cross-section (708) through the artifact attenuated seismic image (432) retains the smooth changes in amplitude visible in FIG. 7A but does not exhibit the checkerboard acquisition footprint.

Figure 8:
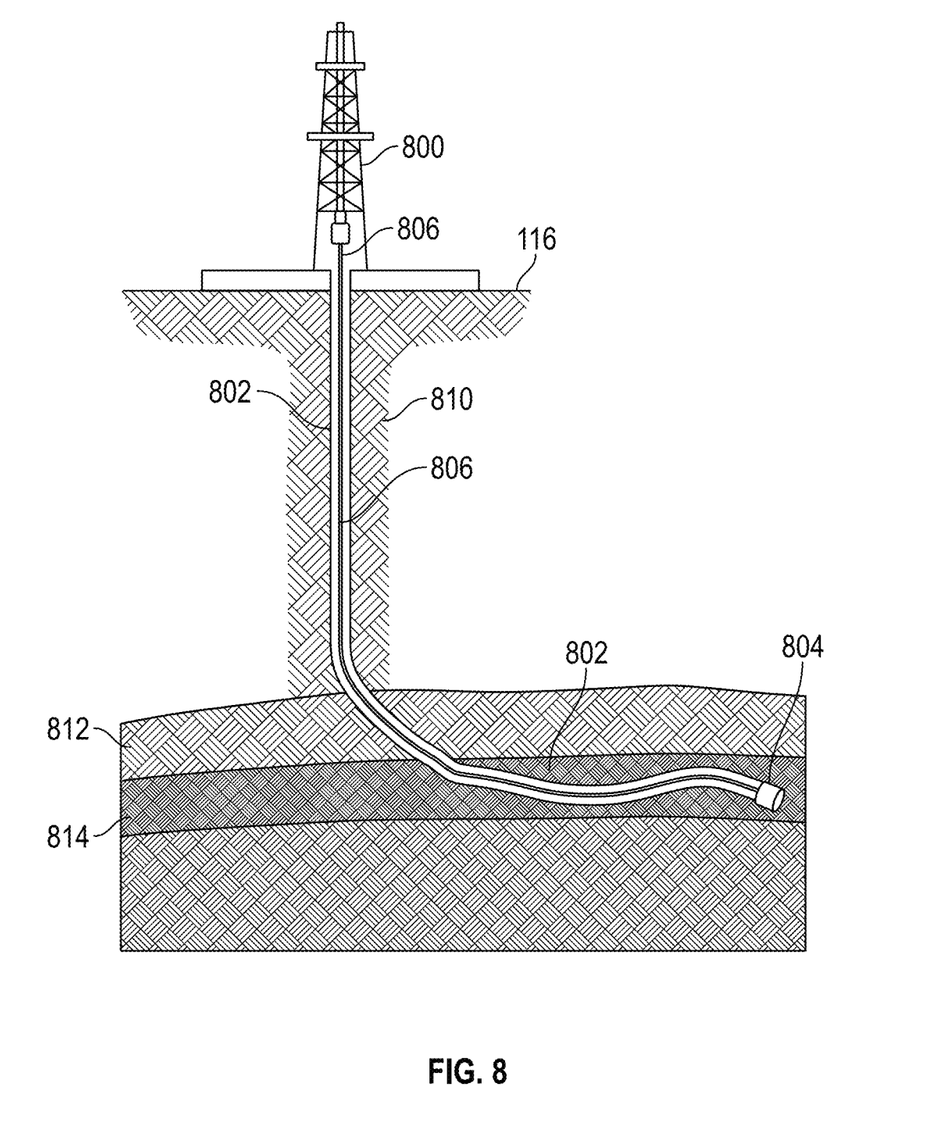
FIG. 8 shows system in accordance with one or more embodiments.

FIG. 8 illustrates systems in accordance with one or more embodiments. As shown in FIG. 8, a well (802) may be drilled by a drill bit (804) attached by a drillstring (806) to a drill rig (808) located on the Earth's surface (116). The well may traverse a plurality of overburden layers (810) and one or more cap-rock layers (812) to a hydrocarbon reservoir (814). In accordance with one or more embodiments, the artifact attenuated seismic image, as shown in FIG. 7B, may be used to identify portions of the subsurface with a likelihood of a presence of a hydrocarbon reservoir (814) and to plan the trajectory of the well (802). In some embodiments the trajectory of the well (802) may be straight and in other embodiments, the trajectory of the well (802) may be curved.

Figure 9:
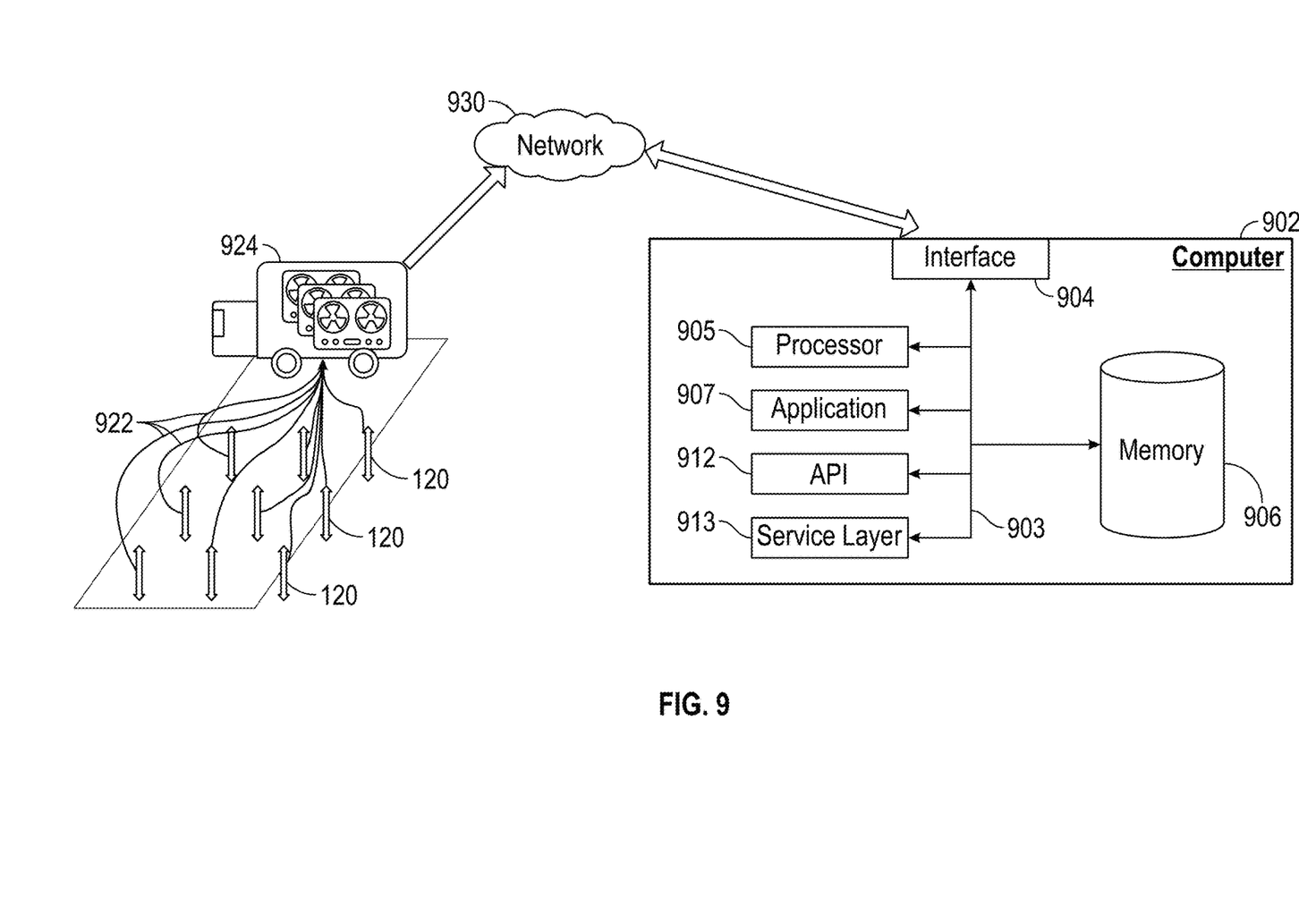
FIG. 9 shows a computer system in accordance with one or more embodiments.

FIG. 9 shows a seismic recording and processing system, in accordance with one or more embodiments. The data recorded by a plurality of seismic receivers (120) may be transmitted to a seismic recording facility (924) located in the neighborhood of the seismic survey (100). The seismic recording facility may be one or more seismic recording trucks (924). The plurality of seismic receivers (120) may be in digitally or analogic telecommunication with the seismic recording facility (924). The telecommunication may be performed over telemetry channels (922) that may be electrical cables, such as coaxial cables, or may be performed wireless using wireless systems, such as Wi-Fi or Bluetooth. Digitization of the seismic data may be performed at each seismic receiver (120), or at the seismic recording facility (924), or at an intermediate telemetry node (not shown) between the seismic receiver (120) and the seismic recording facility (924).

The seismic data may be recorded at the seismic recording facility (924) and stored on non-transitory computer memory. The computer memory may be one or more computer hard-drives, or one or more computer memory tapes, or any other convenient computer memory media familiar to one skilled in the art. The seismic data may be transmitted to a computer (902) for processing. The computer (902) may be located in or near the seismic recording facility (924) or may be located at a remote location, that may be in another city, country, or continent. The seismic data may be transmitted from the seismic recording facility (924) to a computer (902) for processing. The transmission may occur over a network (930) that may be a local area network using an ethernet or Wi-Fi system, or alternatively the network (930) may be a wide area network using an internet or intranet service. Alternatively, seismic data may be transmitted over a network (930) using satellite communication networks. Most commonly, because of its size, seismic data may be transmitted by physically transporting the computer memory, such as computer tapes or hard drives, in which the seismic data is stored from the seismic recording facility (902) to the location of the computer (902) to be used for processing.

FIG. 9 further depicts a block diagram of a computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of forming an artifact attenuated seismic image, comprising:
   obtaining an input seismic image;
   selecting a seismic partition from the input seismic image;
   determining a seismic dip for the seismic partition;
   determining, using a computer processor, a flattened seismic partition from the seismic partition based, at least in part, on the seismic dip;
   determining, using the computer processor, a filtered seismic partition from the flattened seismic partition;
   determining, using the computer processor, an unflattened seismic segment based, at least in part, on the filtered seismic partition; and
   determining, using the computer processor, the artifact attenuated seismic image based, at least in part, on the unflattened seismic segment.

2. The method of claim 1, further comprising:
   identifying a portion of a subterranean region of interest with a likelihood of containing hydrocarbons based, at least in part, on the artifact attenuated seismic image;
   determining a well path through the subterranean region of interest based, at least in part, on the identified portion of the subterranean region of interest; and
   performing the well path using a drilling system.

3. The method of claim 1, wherein the input seismic image is a common mid-point stack.

4. The method of claim 1, wherein the input seismic image is a seismic time-domain image.

5. The method of claim 1, wherein determining the filtered seismic partition from the flattened seismic partition comprises applying a median to a horizontal spatial dimension of the flattened seismic partition.

6. The method of claim 1, wherein determining the seismic dip for the seismic partition comprises:
   transforming the seismic partition into a frequency-wavenumber spectrum; and
   identifying the seismic dip based, at least in part, on a peak value of the frequency-wavenumber spectrum.

7. The method of claim 1, wherein determining the flattened seismic partition comprises shifting an applicate axis of each of a plurality of seismic traces in the seismic partition by a shift based, at least in part, on the seismic dip.

8. A non-transitory computer readable medium storing instructions executable by a computer processor, the instructions comprising functionality for:
receiving an input seismic image;
selecting a seismic partition from the input seismic image;
determining a seismic dip for the seismic partition;
determining a flattened seismic partition from the seismic partition based, at least in part, on the seismic dip;
determining a filtered seismic partition from the flattened seismic partition;
determining an unflattened seismic segment based, at least in part, on the filtered seismic partition; and
determining the artifact attenuated seismic image based, at least in part, on the unflattened seismic segment.

9. The non-transitory computer readable medium of claim 8, further comprising:
identifying a portion of a subterranean region of interest with a likelihood of containing hydrocarbons based, at least in part, on the artifact attenuated seismic image;
determining a well path through the subterranean region of interest based, at least in part, on the identified portion of the subterranean region of interest.

10. The non-transitory computer readable medium of claim 8, wherein the input seismic image is a common mid-point stack.

11. The non-transitory computer readable medium of claim 8, wherein the input seismic image is a seismic time-domain image.

12. The non-transitory computer readable medium of claim 8, wherein determining the filtered seismic partition from the flattened seismic partition comprises applying a median to at least one horizontal spatial dimension of the flattened seismic partition.

13. The non-transitory computer readable medium of claim 8, wherein determining a seismic dip for the seismic partition comprises:
transforming the seismic partition into a frequency-wavenumber spectrum; and
identifying a seismic dip based, at least in part, on a peak value of the frequency-wavenumber spectrum.

14. The non-transitory computer readable medium of claim 8, wherein determining a flattened seismic partition comprises shifting the applicate axis of each seismic trace in the seismic partition by a shift based, at least in part, on the seismic dip.

15. A system for forming an artifact attenuated seismic image, comprising:
a seismic source to emit a radiated seismic wave;
a plurality of seismic receivers for detecting and recording an observed seismic dataset generated by the radiated seismic wave; and
a seismic processor configured to:
receive an input seismic image;
determine a seismic partition from the input seismic image;
determine a seismic dip for the seismic partition;
determine a flattened seismic partition from the seismic partition based, at least in part, on the seismic dip;
determine a filtered seismic partition from the flattened seismic partition;
determine an unflattened seismic segment based, at least in part, on the filtered seismic partition; and
determine the artifact attenuated seismic image based, at least in part, on the unflattened seismic segment.

16. The system of claim 15, wherein the seismic processor is further configured to:
identifying a portion of a subterranean region of interest with a high likelihood of containing hydrocarbons based, at least in part, on the artifact attenuated seismic image;
determining a well path through the subterranean region of interest based, at least in part, on the identified portion of the subterranean region of interest.

17. The system of claim 15, wherein the input seismic image is a common mid-point stack.

18. The system of claim 15, wherein the input seismic image is a seismic time-domain image.

19. The system of claim 15, wherein determining a filtered seismic partition from the flattened seismic partition comprises applying a median to at least one horizontal spatial dimension of the flattened seismic partition.

20. The system of claim 15, wherein determining a seismic dip for the seismic partition comprises:
transforming the seismic partition into a frequency-wavenumber spectrum; and
identifying a seismic dip based, at least in part, on a peak value of the frequency-wavenumber spectrum.

* * * * *